(12) United States Patent
Schilling

(10) Patent No.: US 6,925,071 B2
(45) Date of Patent: *Aug. 2, 2005

(54) SPREAD SPECTRUM BASE STATION

(75) Inventor: Donald L. Schilling, Sands Point, NY (US)

(73) Assignee: InterDigital Technology Corporation, Wilmington, DE (US)

(*) Notice: Subject to any disclaimer, the term of this patent is extended or adjusted under 35 U.S.C. 154(b) by 426 days.

This patent is subject to a terminal disclaimer.

(21) Appl. No.: 10/072,083

(22) Filed: Feb. 8, 2002

(65) Prior Publication Data

US 2002/0118660 A1 Aug. 29, 2002

Related U.S. Application Data

(63) Continuation of application No. 09/395,626, filed on Sep. 14, 1999, now Pat. No. 6,396,824, which is a continuation of application No. 08/871,479, filed on Jun. 9, 1997, now Pat. No. 5,974,039, which is a continuation of application No. 08/628,012, filed on Apr. 4, 1996, now Pat. No. 5,663,956, which is a continuation of application No. 08/311,773, filed on Sep. 23, 1994, now Pat. No. 5,506,864, which is a continuation of application No. 08/178,016, filed on Feb. 23, 1994, now Pat. No. 5,365,544, which is a continuation of application No. 08/006,851, filed on Jan. 21, 1993, now abandoned, and a continuation-in-part of application No. 07/626,109, filed on Dec. 14, 1990, now Pat. No. 5,228,056, which is a continuation-in-part of application No. 07/622,235, filed on Dec. 5, 1990, now Pat. No. 5,351,269.

(51) Int. Cl.[7] .......................... H04B 7/216; H04J 13/02
(52) U.S. Cl. ...................... 370/335; 370/342; 375/145; 375/149
(58) Field of Search ................................ 370/203, 206, 370/208, 329, 335, 342; 375/130, 140, 141, 145, 147, 149; 380/33, 34, 44, 46; 455/450, 451, 452, 456, 509, 517, 524, 67.1, 67.6

(56) References Cited

U.S. PATENT DOCUMENTS

| 3,641,433 A | * | 2/1972 | Mifflin et al. ................ 375/358 |
| 3,731,198 A | | 5/1973 | Blasbalg ..................... 375/1 X |
| 3,819,872 A | | 6/1974 | Hamrich ....................... 179/41 |
| 3,831,013 A | | 8/1974 | Alsup et al. ................. 235/181 |
| 3,838,342 A | | 9/1974 | Bjorkman ..................... 325/32 |
| 3,900,721 A | | 8/1975 | Speiser et al. .............. 235/156 |
| 4,041,391 A | | 8/1977 | Deerkoski .................... 325/30 |
| 4,048,563 A | * | 9/1977 | Osborne ..................... 375/367 |
| 4,052,565 A | | 10/1977 | Baxter et al. ................ 375/1 X |

(Continued)

FOREIGN PATENT DOCUMENTS

| EP | 0265178 | 4/1988 |
| EP | 0367452 | 5/1990 |
| GB | 2173377 A | 10/1986 |
| WO | 8302533 | 7/1983 |

OTHER PUBLICATIONS

In the matter of InterDigital Technology Corporation v. Oki America et al.; Defendant Qualcomm Incorporated's Supplemental Responses to Plantiff's Interrogatories 3, 5, 12 and 13; U.S. District Court for the Eastern District of Pennsylvania, Civil Action No. 93–CV2004 (Bartle, J.).

(Continued)

*Primary Examiner*—Alpus H. Hsu
(74) *Attorney, Agent, or Firm*—Volpe and Koenig, P.C.

(57) ABSTRACT

A spread spectrum remote unit produces a message signal having message data. A reference signal is produced. The reference signal is used to recover the message data from a combined spread spectrum signal. The reference signal and the message signal is combined as a combined signal. The combined signal is transmitted as the combined spread spectrum signal.

15 Claims, 8 Drawing Sheets

U.S. PATENT DOCUMENTS

| | | | |
|---|---|---|---|
| 4,112,372 A | 9/1978 | Holmes et al. | 375/1 X |
| 4,193,031 A | 3/1980 | Cooper | 455/38 |
| 4,222,115 A | 9/1980 | Cooper et al. | 375/1 |
| 4,238,850 A | 12/1980 | Vance | 370/27 |
| 4,247,942 A | 1/1981 | Hauer | 375/25 |
| 4,270,207 A * | 5/1981 | Gutleber | 375/267 |
| 4,279,018 A | 7/1981 | Carson | 375/1 X |
| 4,285,060 A | 8/1981 | Cobb et al. | 375/1 |
| 4,392,220 A | 7/1983 | Hirosaki | 370/18 |
| 4,392,232 A | 7/1983 | Andren et al. | 375/86 |
| 4,418,393 A | 11/1983 | Zscheile, Jr. | 364/724 |
| 4,418,425 A | 11/1983 | Fennel, Jr. et al. | 455/27 |
| 4,425,642 A | 1/1984 | Moses et al. | 370/76 |
| 4,435,821 A | 3/1984 | Ito et al. | 375/1 |
| 4,455,651 A | 6/1984 | Baran | 370/104 |
| 4,479,226 A | 10/1984 | Prabhu et al. | 375/1 |
| 4,484,335 A | 11/1984 | Mosley et al. | 375/1 |
| 4,512,013 A | 4/1985 | Nash et al. | 370/69.1 |
| 4,523,311 A | 6/1985 | Lee et al. | 370/69.1 |
| 4,538,280 A | 8/1985 | Mosley, Jr. et al. | 375/1 |
| 4,553,130 A | 11/1985 | Kato | 370/41 |
| 4,563,774 A | 1/1986 | Gloge | 455/607 |
| 4,599,490 A | 7/1986 | Cornell et al. | 179/2 |
| 4,606,039 A | 8/1986 | Nicolas et al. | 375/1 |
| 4,612,637 A | 9/1986 | Davis et al. | 370/95 |
| 4,621,365 A | 11/1986 | Chiu | 375/1 |
| 4,630,283 A | 12/1986 | Schiff | 375/1 |
| 4,647,863 A | 3/1987 | Skudera, Jr. et al. | 329/112 |
| 4,649,549 A | 3/1987 | Halpern et al. | 380/32 |
| 4,653,069 A | 3/1987 | Roeder | 380/31 |
| 4,660,164 A | 4/1987 | Leibowitz | 364/728 |
| 4,665,404 A | 5/1987 | Christy et al. | 342/463 |
| 4,672,605 A | 6/1987 | Hustig et al. | 370/76 |
| 4,672,629 A | 6/1987 | Beier | 375/1 |
| 4,672,658 A | 6/1987 | Kavehrad et al. | 379/63 |
| 4,675,839 A | 6/1987 | Kerr | 364/821 |
| 4,680,785 A | 7/1987 | Akiyama et al. | 379/57 |
| 4,691,326 A | 9/1987 | Tsuchiya | 375/1 |
| 4,697,260 A | 9/1987 | Grauel et al. | 370/18 |
| 4,703,474 A | 10/1987 | Foschini et al. | 370/18 |
| 4,707,839 A | 11/1987 | Andren et al. | 375/1 |
| 4,718,080 A | 1/1988 | Serrano et al. | 379/59 |
| 4,730,340 A | 3/1988 | Frazier, Jr. | 375/1 |
| 4,742,512 A | 5/1988 | Akashi et al. | 370/96 |
| 4,752,939 A | 6/1988 | Amoroso et al. | 375/1 |
| 4,759,034 A | 7/1988 | Nagazumi | 375/1 |
| 4,765,753 A | 8/1988 | Schmidt | 379/60 |
| 4,789,983 A | 12/1988 | Acampora et al. | 370/96 |
| 4,799,252 A | 1/1989 | Eizenhoffer et al. | 379/59 |
| 4,799,253 A | 1/1989 | Stern et al. | 379/59 |
| 4,805,208 A | 2/1989 | Schwartz | 379/93 |
| 4,807,222 A | 2/1989 | Amitay | 370/85 |
| 4,837,802 A | 6/1989 | Hiashiyama et al. | 379/62 |
| 4,837,823 A | 6/1989 | Ham et al. | 380/34 |
| 4,841,545 A | 6/1989 | Endo et al. | 375/1 |
| 4,843,612 A | 6/1989 | Brusch et al. | 375/1 |
| 4,850,036 A | 7/1989 | Smith | 455/179 |
| 4,860,307 A | 8/1989 | Nakayama | 375/1 |
| 4,862,178 A | 8/1989 | Sturza et al. | 342/357 |
| 4,864,588 A * | 9/1989 | Simpson et al. | 375/365 |
| 4,866,732 A | 9/1989 | Carey et al. | 375/1 |
| 4,894,842 A | 1/1990 | Broekhoven et al. | 375/1 |
| 4,901,307 A | 2/1990 | Gilhousen et al. | 370/18 |
| 4,905,221 A | 2/1990 | Ichiyoshi | 375/1 X |
| 4,912,722 A | 3/1990 | Carlin | 375/1 |
| 4,914,651 A | 4/1990 | Lusignan | 370/69.1 |
| 4,922,506 A | 5/1990 | McCallister et al. | 375/1 |
| 4,930,140 A | 5/1990 | Cripps et al. | 375/1 |
| 4,932,037 A | 6/1990 | Simpson et al. | 375/1 |
| 4,933,953 A | 6/1990 | Yagi | 375/1 |
| 4,958,359 A | 9/1990 | Kato | 375/1 |
| 4,962,507 A | 10/1990 | Renshaw | 375/1 |
| 4,969,159 A | 11/1990 | Belcher et al. | 375/1 |
| 4,977,577 A | 12/1990 | Arthur et al. | 375/1 |
| 4,977,578 A | 12/1990 | Ishigaki et al. | 375/1 |
| 4,979,183 A | 12/1990 | Cowart | 375/1 |
| 4,984,247 A | 1/1991 | Kaufmann et al. | 375/1 |
| 5,005,169 A | 4/1991 | Bronder et al. | 370/76 |
| 5,016,255 A | 5/1991 | Dixon et al. | 375/1 |
| 5,016,256 A | 5/1991 | Stewart | 375/1 |
| 5,022,046 A | 6/1991 | Morrow, Jr. | 375/1 |
| 5,022,047 A | 6/1991 | Dixon et al. | 375/1 |
| 5,023,887 A | 6/1991 | Takeuchi et al. | 375/1 |
| 5,029,180 A * | 7/1991 | Cowart | 375/141 |
| 5,029,181 A | 7/1991 | Endo et al. | 375/1 |
| 5,036,330 A | 7/1991 | Imae et al. | 342/357 |
| 5,036,523 A * | 7/1991 | Briskman | 375/141 |
| 5,040,238 A | 8/1991 | Comroe et al. | 455/33 |
| 5,041,833 A | 8/1991 | Weinberg | 342/357 |
| 5,048,052 A | 9/1991 | Hamatsu et al. | 375/1 |
| 5,056,106 A | 10/1991 | Wang et al. | 375/1 |
| 5,056,109 A | 10/1991 | Gilhousen et al. | 375/1 |
| 5,062,121 A | 10/1991 | Kurihara et al. | 375/1 |
| 5,063,560 A | 11/1991 | Yerbury et al. | 370/18 |
| 5,067,147 A | 11/1991 | Lee | 379/60 |
| 5,073,900 A | 12/1991 | Mallinckrodt | 375/1 |
| 5,077,753 A | 12/1991 | Grau, Jr. et al. | 375/1 |
| 5,077,754 A | 12/1991 | Namioka | 375/1 |
| 5,093,840 A | 3/1992 | Schilling | 375/1 |
| 5,101,501 A | 3/1992 | Gilhousen et al. | 455/33 |
| 5,103,459 A | 4/1992 | Gilhousen et al. | 375/1 |
| 5,109,390 A | 4/1992 | Gilhousen et al. | 375/1 |
| 5,121,407 A | 6/1992 | Partyka et al. | 375/1 |
| 5,153,598 A | 10/1992 | Alves, Jr. | 342/352 |
| 5,161,789 A | 11/1992 | Rogers | 375/1 |
| 5,164,985 A | 11/1992 | Nysen et al. | 375/1 |
| 5,166,694 A | 11/1992 | Russell et al. | 342/457 |
| 5,166,951 A | 11/1992 | Schilling | 375/1 |
| 5,179,571 A | 1/1993 | Schilling | 375/1 |
| 5,179,572 A | 1/1993 | Schilling | 375/1 |
| 5,185,762 A | 2/1993 | Schilling | 375/1 |
| 5,189,683 A * | 2/1993 | Cowart | 375/142 |
| 5,193,101 A | 3/1993 | McDonald et al. | 375/200 |
| 5,212,805 A | 5/1993 | Comroe et al. | 455/33.1 |
| 5,216,429 A | 6/1993 | Nakagawa et al. | 342/250 |
| 5,218,618 A | 6/1993 | Sagey | 375/1 |
| 5,224,120 A | 6/1993 | Schilling | 375/1 |
| 5,228,053 A | 7/1993 | Miller et al. | 375/200 |
| 5,228,056 A | 7/1993 | Schilling | 375/1 |
| 5,247,702 A | 9/1993 | Su et al. | 455/34 |
| 5,257,283 A | 10/1993 | Gilhousen et al. | 375/1 |
| 5,260,967 A | 11/1993 | Schilling | 375/1 |
| 5,263,045 A | 11/1993 | Schilling | 375/1 |
| 5,265,121 A | 11/1993 | Stewart | 375/99 |
| 5,267,244 A | 11/1993 | Messerschmitt et al. | 370/95 |
| 5,274,665 A | 12/1993 | Schilling | 375/1 |
| 5,303,286 A | 4/1994 | Weideman | 375/1 |
| 5,329,547 A * | 7/1994 | Ling | 370/342 |
| 5,339,330 A | 8/1994 | Mallinckrodt | 375/205 |
| 5,351,269 A | 9/1994 | Schilling | 375/1 |
| 5,365,544 A | 11/1994 | Schilling | 375/7 |
| 5,410,568 A | 4/1995 | Schilling | 375/205 |
| 5,420,896 A | 5/1995 | Schilling | 375/205 |
| 5,469,468 A | 11/1995 | Schilling | 375/300 |
| 5,506,864 A | 4/1996 | Schilling | 375/205 |

OTHER PUBLICATIONS

Frequenz, No. 9/10, Sep. 20, 1986, Berline De, pp. 256–259, Eizenhöfer 'Anwendung der Spread–Spectrum–Technik in dem hybriden Mobilfunksystem MATS–D'.

Fluhr, Z.C. and Porter, P.T., "Advanced Mobile Phone Service: Control Architecture", The Bell System Technical Journal (Jan. 1979), vol. 58, No. 1, pp. 43–69.

DeGaudenzi, R. and Viola, R., "A Novel Code Division Multiple Access System for High Capacity Mobile Communications Satellites", ESA Journal (1989), vol. 13, pp. 303–322.

Stiffler, J.J., Theory of Synchronous Communications (Prentice–Hall, Inc., New Jersey), table of contents listing.

Scholtz, Robert A., "The Origins of Spread–Spectrum Communications", IEEE Transactions on Communications (May 1982), vol. Com. 30, No. 5; pp. 822–855.

Nettleton, Raymond W., Spectral Efficiency in Cellular Land–Mobile Communications: A Spread–Spectrum Approach (1978) (unpublished Ph.D. Dissertation, Purdue University.

Cooper, George R. and Nettleton, Ray, W., "Cellular Mobile Technology: The Great Multiplier," IEEE Spectrum, Jun. 1983, pp. 30–37.

Blasbalg, H., "A Comparison of Pseudo–Noise and Conventional Modulation for Multiple–Access Satellite Communications," IBM Journal of Research Development, vol. 9, No. 4, Jul. 1965, pp. 241–255.

Dixon, Robert C., Spread Spectrum Systems (John Wiley & Sons, Inc.: New York, 3d ed. 1994), pp. 412–413.

The International Dictionary of Physics and Electronics (D. Van Nostrand Co.: Princeton, NJ, 2d ed. 1961), pp. 612, 952.

Robinson, Vester, Solid–State Circuit Analysis (Reston Publishing Co.: Reston, VA, 1975), pp. 309–314.

Alavi, Hossein, Power Control and Interference Management in a Spread–Spectrum Cellular Mobile Radio System (1984) (Unpublished Ph.D. Dissertation, Michigan State University).

M.S. Pursley, "Performance Evaluation for Phase–Coded Spread–Spectrum Multiple–Access Communication—Part I: System Analysis", IEEE Transactions on Communications, Com–25, No. 8, Aug., 1997.

J.M. Holtzman, "A Simple, Accurate Method To Calculate Spead–Spectrum Multiple–Access Error Probabilities", IEEE Transactions on Communications, vol. 40, no. 3, Mar. 1992.

* cited by examiner

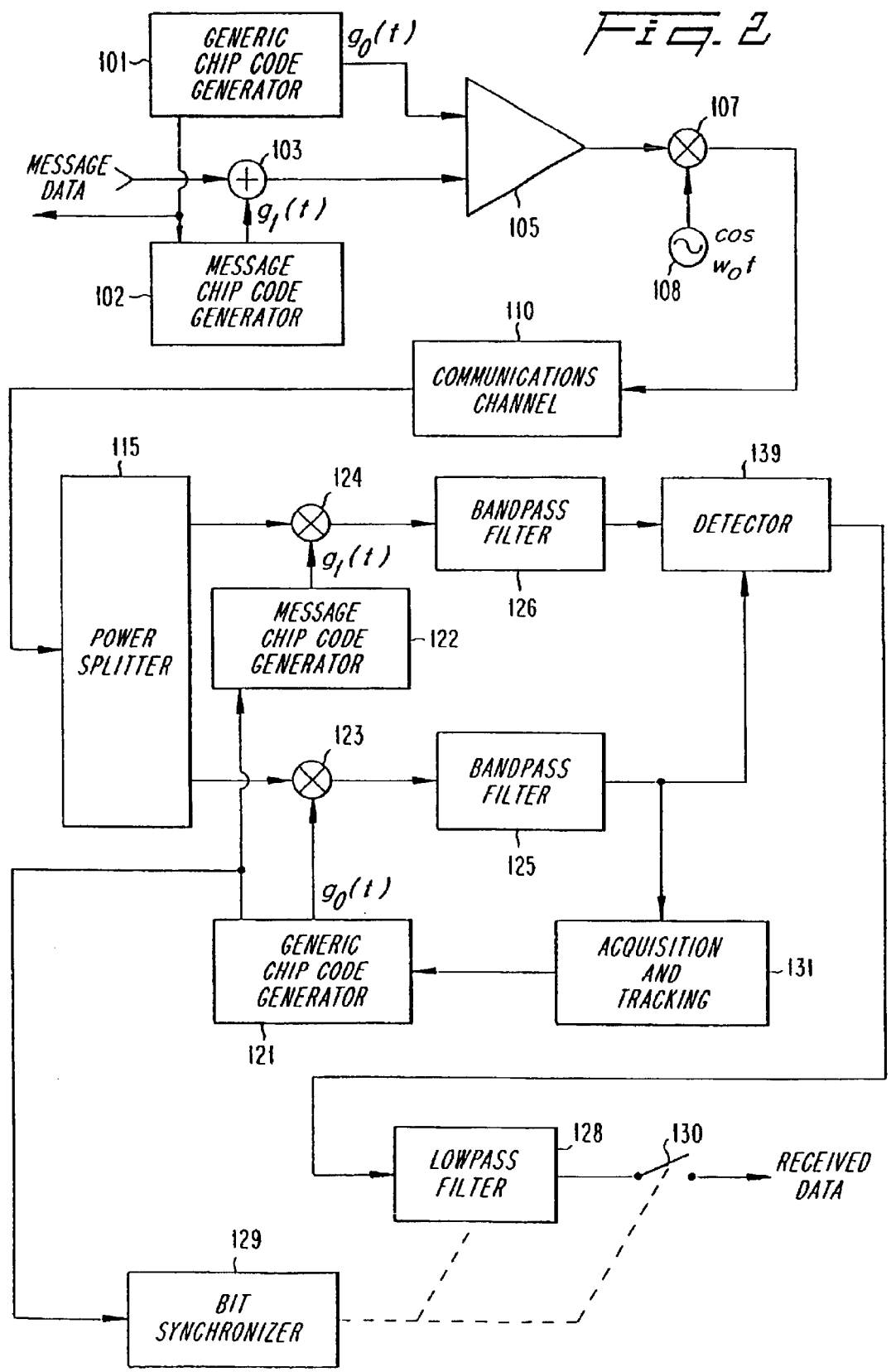

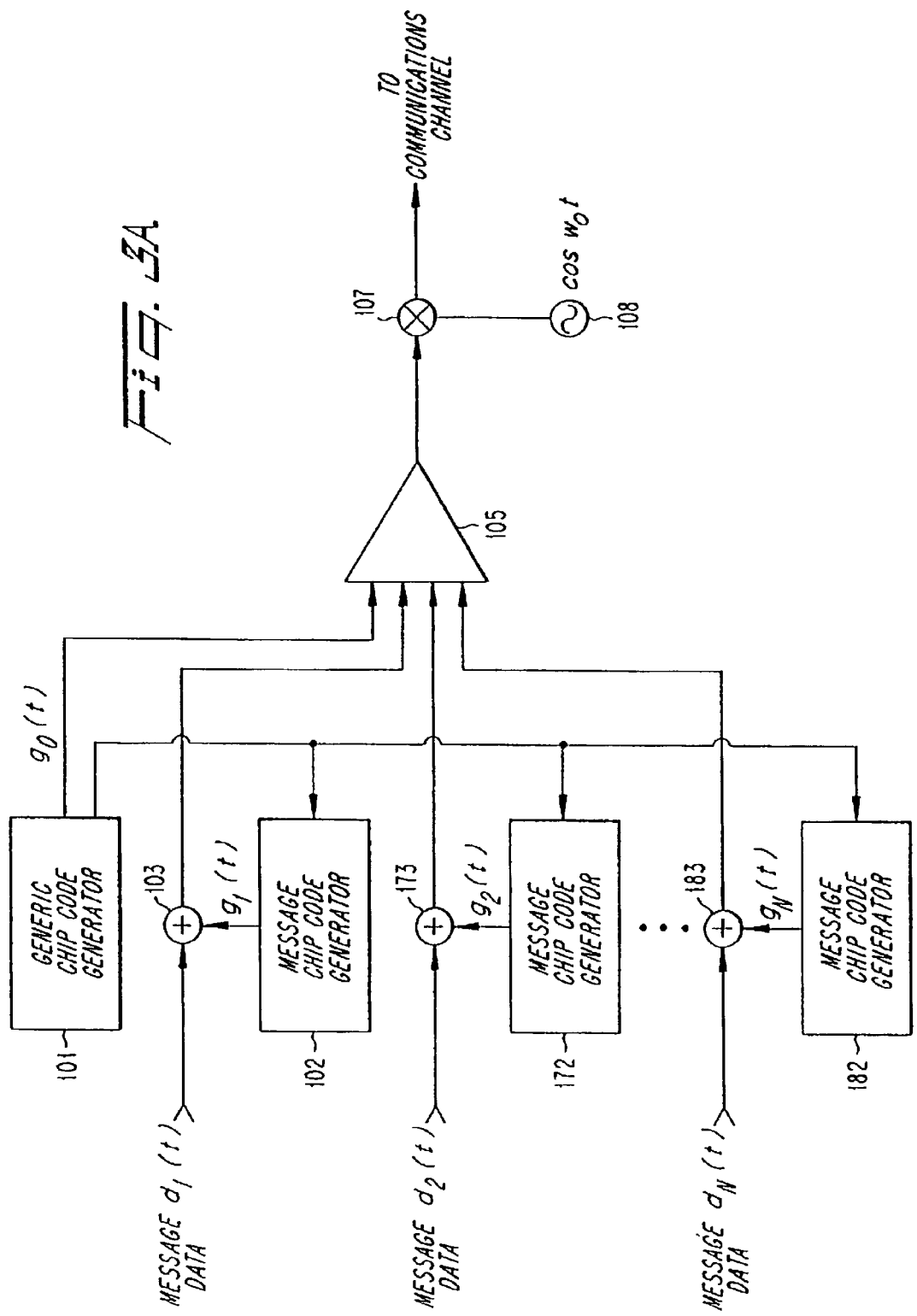

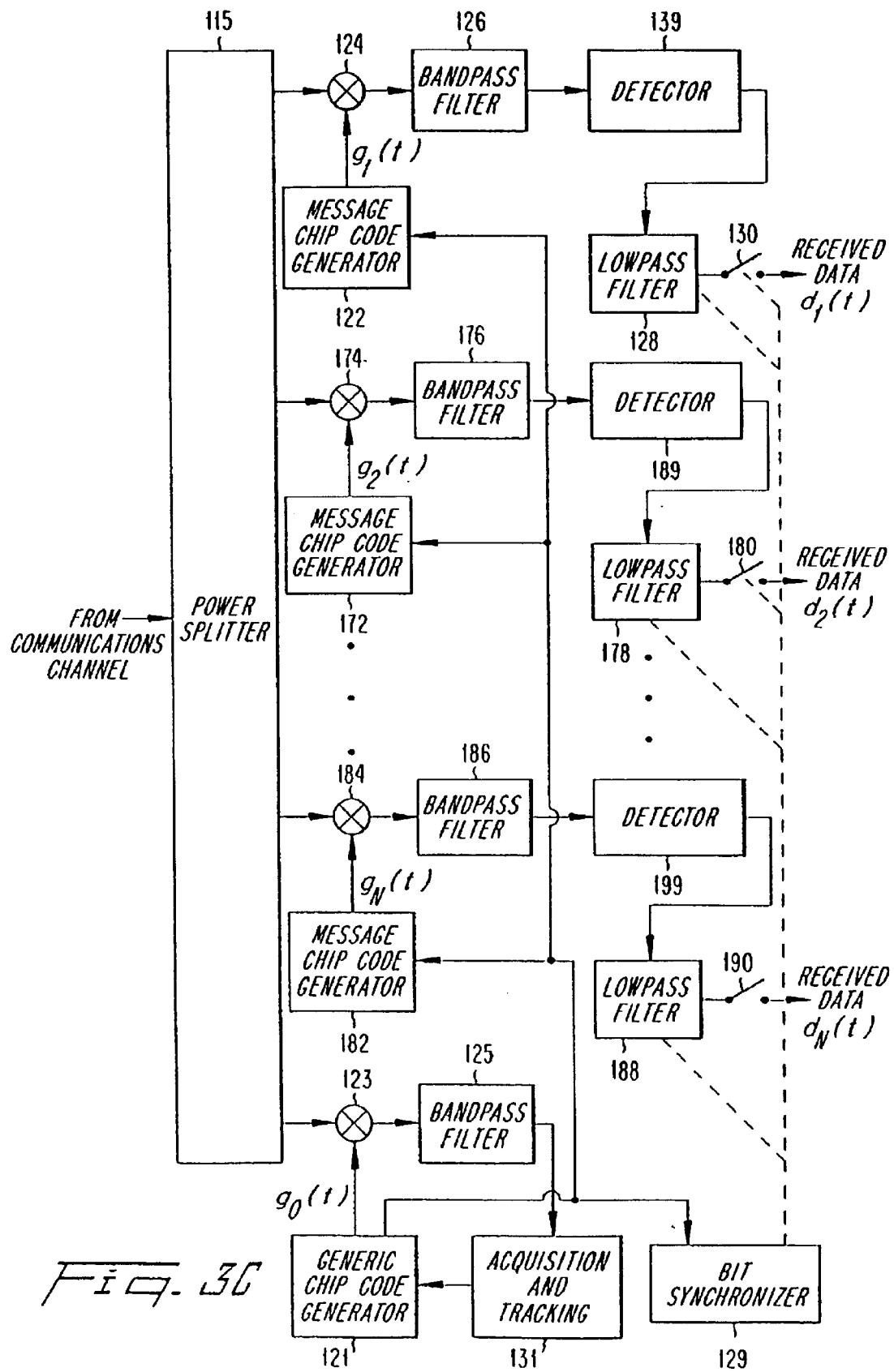

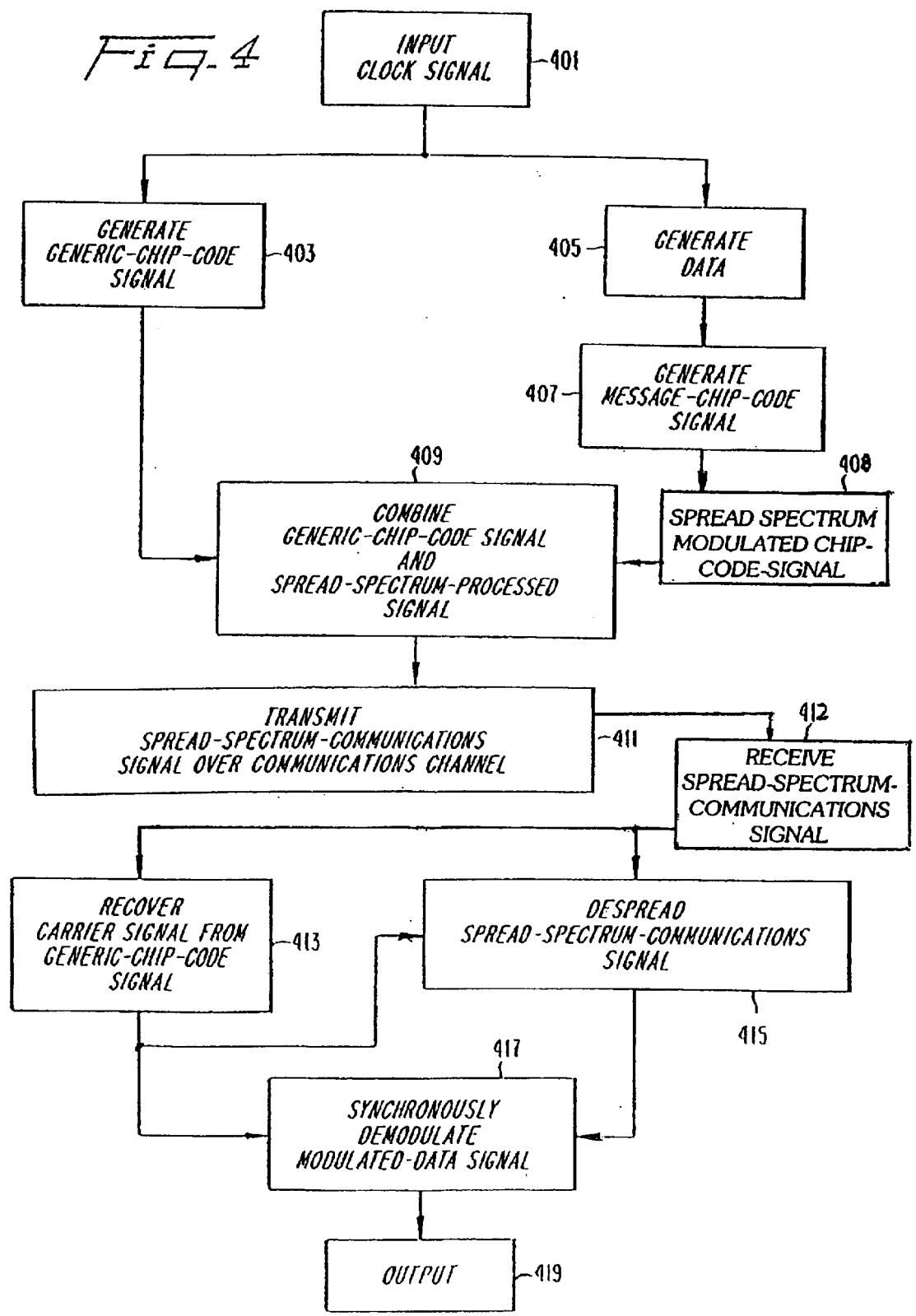

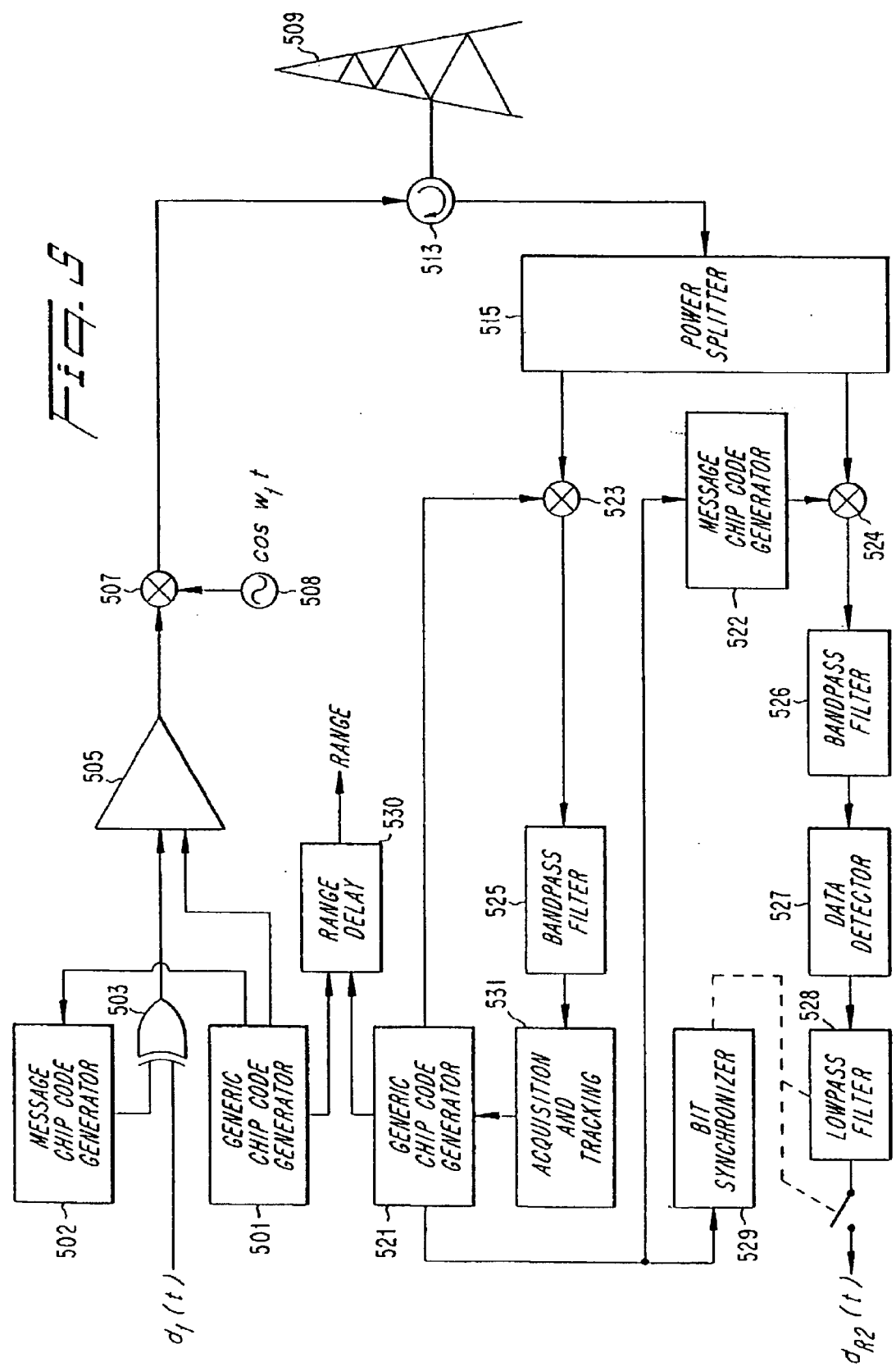

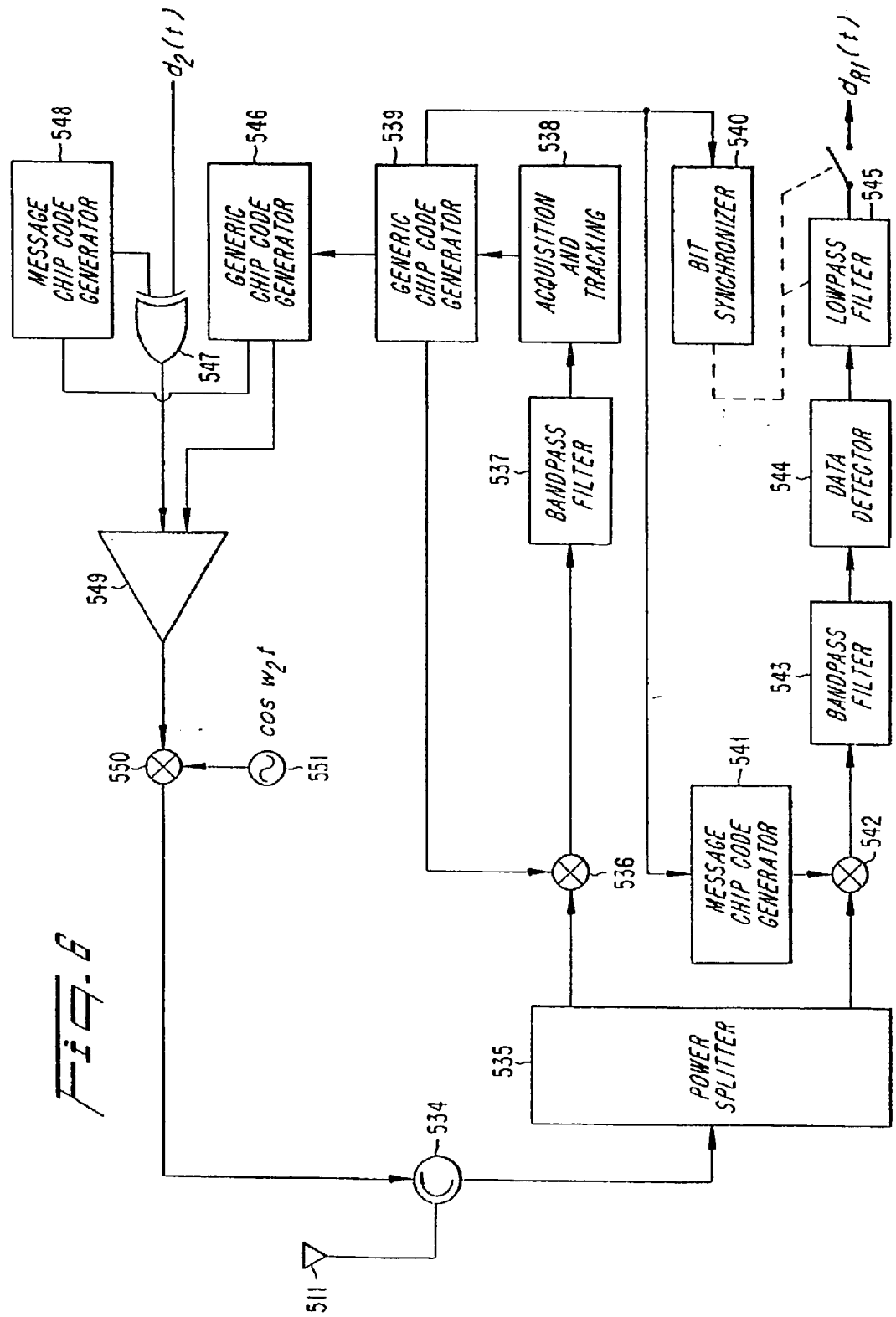

SPREAD SPECTRUM BASE STATION

This patent is a continuation application of U.S. patent application Ser. No. 09/395,626, filed on Sep. 14, 1999 now U.S. Pat. No. 6,396,824, which is a continuation application of U.S. patent application Ser. No. 08/871,479, filed on Jun. 9, 1997, now U.S. Pat. No. 5,974,039, issued Oct. 26, 1999, which is a continuation application of U.S. patent application Ser. No. 08/628,012, filed on Apr. 4, 1996, now U.S. Pat. No. 5,663,956, issued Sep. 2, 1997, which is a continuation application of U.S. patent application Ser. No. 08/311,773, filed Sep. 23, 1994, now U.S. Pat. No. 5,506,864, issued Apr. 9, 1996, which is a continuation of U.S. patent application Ser. No. 08/178,016, filed Feb. 23, 1994, now U.S. Pat. No. 5,365,544, issued Nov. 15, 1994, which was a file wrapper continuation application of U.S. patent application Ser. No. 08/006,851, filed Jan. 21, 1993, now abandoned, which was a continuation-in-part application of U.S. patent application Ser. No. 07/622,235, filed Dec. 5, 1990, now U.S. Pat. No. 5,351,269, issued Sep. 27, 1994, and of U.S. patent application Ser. No. 07/626,109, filed Dec. 14, 1990, now U.S. Pat. No. 5,228,056, issued Jul. 13, 1993.

BACKGROUND

This invention relates to spread-spectrum communications and more particularly to a system and method for locating within a cell, a remote unit communicating synchronously with a spread-spectrum-communications signal using a reference carrier signal supplied on a spread-spectrum channel by the transmitter.

DESCRIPTION OF THE RELEVANT ART

Referring to FIG. 1, message data, d(t), are processed by spread-spectrum modulator 51, using a message-chip-code signal, $g_1(t)$, to generate a spread-spectrum data signal. The spread-spectrum data signal is processed by transmitter 52 using a carrier signal at a carrier frequency $f_o$, and transmitted over communications channel 53.

At a receiver, a spread-spectrum demodulator 54 despreads the received spread-spectrum signal, and the message data are recovered by synchronous data demodulator 60 as received data. The synchronous data demodulator 60 uses a reference signal for synchronously demodulating the despread spread-spectrum signal. The square-law device 55, bandpass filter 56 and frequency divider 57 are well known in the art for generating a reference signal from a received modulated data signal. A Costas Loop or other reference signal generating circuit is adequate for this purpose.

In a fading channel, such as the ionosphere or any channel containing multipath, or more generally, any channel in which the received signal's amplitude fluctuates with time, synchronous demodulation is not practical since the phase of the incoming signal typically is not the same as the phase of the reference. In such cases differential phase shift keying (DPSK) is employed. With DPSK the received signal is delayed by one symbol and multiplied by the undelayed signal. If the resulting phase is less than ±90° a 0-bit is declared, otherwise a 1-bit is declared. Such a system is complex and suffers degradation of about 6 dB at error rates of $10^{-2}$.

The prior art does not provide a system and method for synchronously communicating, using spread-spectrum modulation, with a base station and in combination locating a remote unit within the cell of a base station.

SUMMARY

A spread spectrum base station receives a spread spectrum signal. The spread spectrum signal includes a reference signal and a message signal. The message signal has message data. The reference signal is detected within the received combined spread spectrum signal. The message data of the message signal is recovered using the reference signal.

A spread spectrum base station produces a message signal having message data. A reference signal is produced. The reference signal is used to recover the message data from a combined spread spectrum signal. The reference signal and the message signal is combined as a combined signal. The combined signal is transmitted as the combined spread spectrum signal.

BRIEF DESCRIPTION OF THE DRAWING(S)

The accompanying drawings, which are incorporated in and constitute a part of the specification, illustrate preferred embodiments of the invention, and together with the description serve to explain the principles of the invention.

FIG. 2 shows a synchronous spread-spectrum system with a bit synchronizer, synchronized to a generic chip code generator according to the present invention;

FIG. 3A shows a synchronous spread spectrum transmitter system for a plurality of message data;

FIG. 3C shows a spread spectrum receiver using a non-synchronous detector for receiving a plurality of spread-spectrum processed signals;

FIG. 4 shows a synchronous spread-spectrum demodulating method;

FIG. 5 is a block diagram of a base station for communicating synchronously with, and geolocating, a remote unit; and FIG. 6 is a block diagram of a remote unit for communicating with a base station and for geolocation.

DETAILED DESCRIPTION OF THE PREFERRED EMBODIMENT(S)

Figure 1:
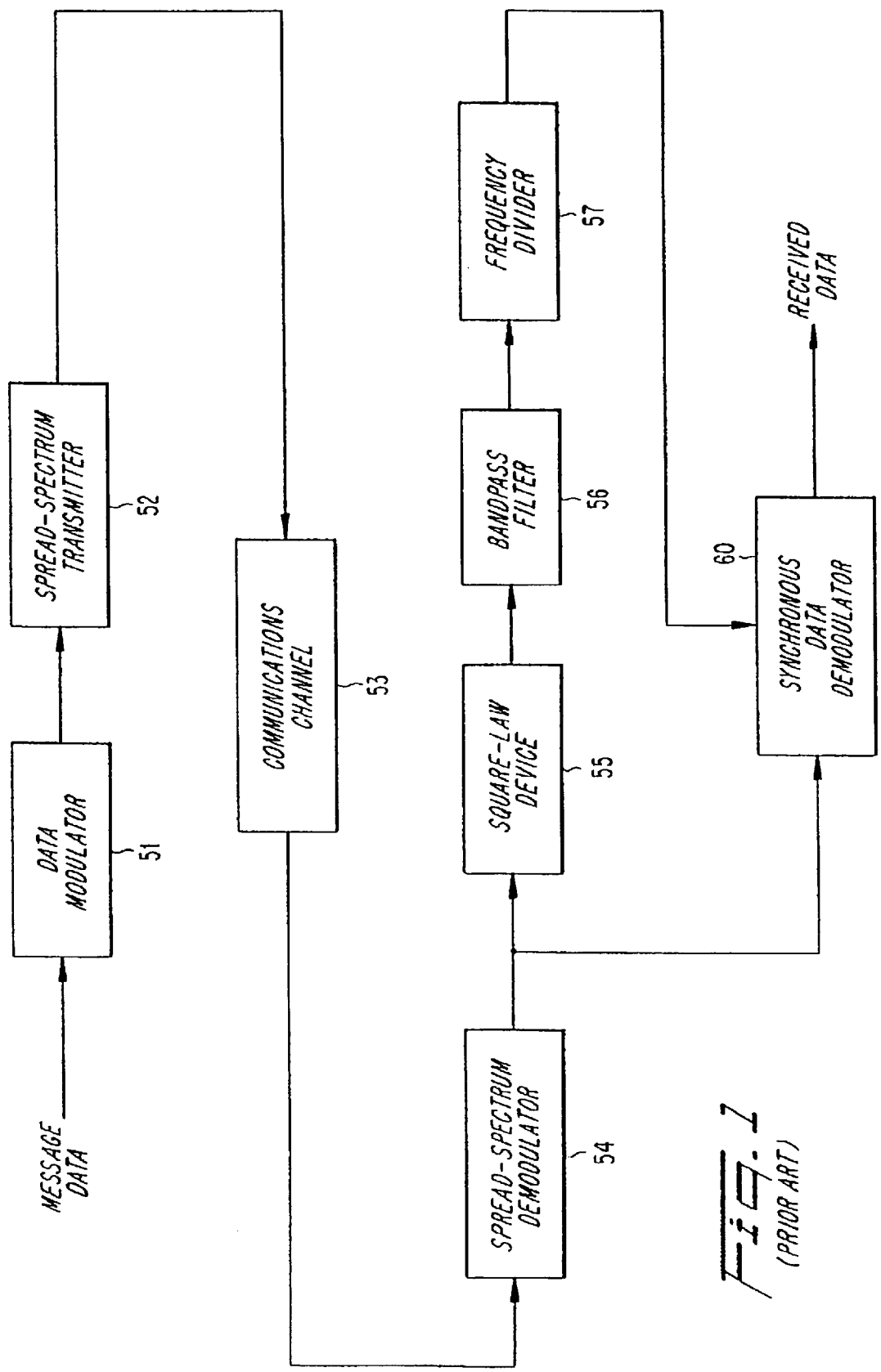
FIG. 1 is a prior art scheme for synchronously recovering message data.

Reference is now made in detail to the present preferred embodiments of the invention, examples of which are illustrated in the accompanying drawings, wherein like reference numerals indicate like elements throughout the several views.

The spread-spectrum communications and geolocation system and method of the present invention is an extension of an invention disclosed in a U.S. patent application entitled, SYNCHRONOUS-SPREAD-SPECTRUM COMMUNICATIONS SYSTEM AND METHOD, by Donald L. Schilling, having U.S. patent application Ser. No. 07/626,109 and filing date of Dec. 14, 1990, now issued U.S. Pat. No. 5,228,056. For completeness of disclosure, the following discussion includes the disclosure in the original patent application, and subsequently goes into a discussion for geolocation.

The spread spectrum signals of the present invention are designed to be "transparent" to other users, i.e., spread spectrum signals are designed to provide negligible interference to the communication of other existing users. The presence of a spread spectrum signal is difficult to determine. This characteristic is known as low probability of interception (LPI) and low probability of detection (LPD). The LPI and LPD features of spread spectrum allow transmission between users of a spread spectrum CDMA communications system without the existing users of the mobile cellular system experiencing significant interference. The present invention makes use of LPI and LPD with respect to predetermined channels in the mobile cellular system or in the fixed-service microwave system. By having the power level of each spread spectrum signal below the predetermined level, then the total power from all spread spectrum used within a cell does not interfere with mobile users in a mobile cellular system, or with microwave users in the fixed-service microwave system.

Spread spectrum is also "jam" or interference resistant. A spread spectrum receiver spreads the spectrum of the interfering signal. This reduces the interference from the interfering signal so that it does not noticeably degrade performance of the spread spectrum system. This feature of interference reduction 10 makes spread spectrum useful for commercial communications, i.e., the spread spectrum waveforms can be overlaid on top of existing narrowband signals.

The present invention employs direct sequence spread spectrum, which uses a phase modulation technique. Direct sequence spread spectrum takes the power that is to be transmitted and spreads it over a very wide bandwidth so that the power per unit bandwidth (watts/hertz) is minimized. When this is accomplished, the transmitted spread spectrum power received by a mobile cellular user or a microwave user, having a relatively narrow bandwidth, is only a small fraction of the actual transmitted power.

In a fixed-service microwave system, byway of example, if a spread spectrum signal having a power of 10 milliwatts is spread over a fixed-service microwave bandwidth of 10 MHz and a microwave user employs a communication system having a channel bandwidth of only 2 MHz, then the effective interfering power due to one spread spectrum signal, in the narrow band communication system, is reduced by the factor of 10 MHz/2 MHz. For fifty concurrent users of spread spectrum, the power of the interfering signal due to spread spectrum is increased by fifty.

The feature of spread spectrum that results in interference reduction is that the spread spectrum receiver actually spreads the received energy of any interferer over the same wide bandwidth, 10 MHz in the present example, while compressing the bandwidth of the desired received signal to its original bandwidth. For example, if the original bandwidth of the desires message data is only 30 kHz, then the power of the interfering signal produced at a base station is reduced by 10 MHz/30 kHz.

Direct sequence spread spectrum achieves a spreading of the spectrum by modulating the original signal with a very wideband signal relative to the data bandwidth. This wideband signal is chosen to have two possible amplitudes, +1 and −1, and these amplitudes are switched, in a "pseudo-random" manner, periodically. Thus, at each equally spaced time interval, a decision is made as to whether the wideband modulating signal should be +1 or −1. If a coin were tossed to make such a decision, the resulting sequence would be truly random. However, in such a case, the receiver would not know the sequence a priori and could not properly receive the transmission. Instead, a chip-code generator generates electronically an approximately random sequence, called a pseudo-random sequence, which is known a priori to the transmitter and receiver.

Code Division Multiple Access

Code division multiple access (CDMA) is a direct sequence spread spectrum system in which a number, at least two, of spread-spectrum signals communicate simultaneously, each operating over the same frequency band. In a CDMA system, each user is given a distinct chip code. This chip code identifies the user. For example, if a first user has a first chip code, $g_1$ (t), and a second user has a second chip code, $g_2$ (t), etc., then a receiver, desiring to listen to the first user, receives at its antenna all of the energy sent by all of the users. However, after despreading the first user's signal, the receiver outputs all the energy of the first user but only a small fraction of the energies sent by the second, third, etc., users.

CDMA is interference limited. That is, the number of users that can use the same spectrum and still have acceptable performance is determined by the total interference power that all of the users, taken as a whole, generate in the receiver. Unless one takes great care in power control, those CDMA transmitters which are close to the receiver cause overwhelming interference. This effect is known as the "near-far" problem. In a mobile environment the near-far problem could be the dominant effect. Controlling the power of each individual mobile remote user is possible so that the received power from each mobile remote user is the same. This technique is called "adaptive power control". See U.S. Pat. No. 5,093,840, having issue date of Mar. 3, 1992, entitled, ADAPTIVE POWER CONTROL FOR A SPREAD SPECTRUM SYSTEM AND METHOD, by Donald L. Schilling, which is incorporated herein by reference.

The spread spectrum communications system of the present invention is a code division multiple access (CDMA) system. Spread spectrum CDMA can significantly increase the use of spectrum. With CDMA, each user in a cell uses the same frequency band. However, each CDMA signal has a separate pseudo random code which enables a receiver to distinguish a desired signal from the remaining signals. Remote users in adjacent cells use the same frequency band and the same bandwidth, and therefore "interfere" with one another. A received signal may appear somewhat noisier as the number of users' signals received by a PCN base station increases.

Each unwanted user's signal generates some interfering power whose magnitude depends on the processing gain. Remote users in adjacent cells increase the expected interfering energy compared to remote users within a particular cell by about 50%, assuming that the remote users are uniformly distributed throughout the adjacent cells. Since the interference increase factor is not severe, frequency reuse is not employed.

Each spread spectrum cell can use a full 10 MHz band for transmission and a full 10 MHz band for reception. Hence, using a chip rate of five million chips per second and a coding data rate of 4800 bps results in approximately a processing gain of 1000 chips per bit. It is well known to those skilled in the art: that the maximum number of CDMA remote users that can concurrently use a frequency band is approximately equal to the processing gain.

Synchronous Spread Spectrum Communications

As illustratively shown in FIG. 2, a spread spectrum code division multiple access (CDMA) communications system for use over a communications channel 110 is provided comprising generic means, message means, spreading means, summer means, transmitting means, generic-spread-spectrum-processing means, message-spread-spectrum-processing means, acquisition and tracking means, detection means and synchronous means. The generic means and message means are embodied as a transmitter-generic-chip-code generator 101 and transmitter-message-chip-code generator 102. The spreading means is shown as an EXCLUSIVE-OR device 103, which may be an EXCLUSIVE-OR gate. Summer means is a combiner 105 and the transmitting means includes a transmitter which is embodied as a signal source 108 coupled to modulator 107. The transmitter-message-chip-code generator 102 is coupled to the EXCLUSIVE-OR device 103 and the generic-chip-code generator 101 is shown coupled to the transmitter-message-chip-code generator 102 and the source for message data. The EXCLUSIVE-OR device 103 and the transmitter-generic-chip-code generator 101 are coupled to the combiner 105. The modulator 107 is coupled between the combiner 105 and the communications channel 110.

At the receiver the generic-spread-spectrum-processing means is embodied as the receiver-generic-chip-code generator 121, the generic mixer 123 and the generic-bandpass filter 125. The generic mixer 123 is coupled between the receiver-generic-chip-code generator 121 and the generic-bandpass filter 125. The message-spread-spectrum-processing means is embodied as a receiver-message-chip-code generator 122, a message mixer 124 and, a message-bandpass filter 126. The message mixer 124 is coupled between the receiver-message-chip-code generator 122 and the message-bandpass filter 126. A power splitter 115 is coupled between the communications channel 110, and the generic mixer 123 and the message mixer 124.

The acquisition and tracking means is embodied as an acquisition and tracking circuit 131. The acquisition and tracking circuit 131 is coupled to an output of the generic-bandpass filter 125, and to the receiver-generic-chip-code generator 121. The receiver-message-chip-code generator 122 preferably is coupled to the receiver-generic-chip-code generator 121.

The detection means is embodied as a detector 139. The detector 139 is coupled to the message-bandpass filter 126 and the generic-bandpass filter 125. The detector 139 may be a nonsynchronous detector such as an envelope detector or square-law detector. Alternatively, the detector 139 may be a synchronous detector, which uses a recovered-carrier signal from the generic-bandpass filter 125.

The synchronous means includes bit means, a lowpass filter 128 and electronic switch 130. The bit means is embodied as a bit synchronizer 129. The lowpass filter 128 and electronic switch 130 are coupled to the bit synchronizer 129. The bit synchronizer 129, as shown in FIG. 2, preferably is coupled to the receiver-generic-chip-code generator 121. Alternatively, the bit synchronizer 129 may be coupled to an output of the detector 139.

The transmitter-generic-chip-code generator 101 generates a generic-chip-code signal, $g_0$ (t), and the transmitter-message-chip-code generator 102 generates a message-chip-code signal, $g_1$ (t). Synchronous timing of the message data, $d_1$ (t), and the message-chip-code signal, in FIG. 2, is provided by the generic-chip-code signal, although other sources can be used such as a common clock signal for synchronization. The EXCLUSIVE-OR device 103 generates a spread-spectrum signal by spread-spectrum processing message data with the message-chip-code signal. The spread-spectrum processing may be accomplished by modulo-2 adding the message data to the message-chip-code signal. The combiner 105 combines the generic-chip-code signal with the spread-spectrum-processed signal. The combined generic-chip-code signal and spread-spectrum-processed signal may be a multilevel signal, having the instantaneous voltage levels of the generic-chip-code signal and the spread-spectrum-processed signal.

The modulator 107, as part of the transmitter, modulates the combined generic-chip-code signal and spread-spectrum-processed signal by a carrier signal, $\cos \omega_o t$, at a carrier frequency, $f_o$. The modulated generic-chip-code signal and spread-spectrum processed signal are transmitted over the communications channel 110 as a code division multiple access (CDMA) signal, $x_c$ (t). Thus, the CDMA signal includes the generic-chip-code signal and the spread-spectrum-processed signal as if they were each modulated separately, and synchronously, on separate carrier signals having the same carrier frequency, $f_o$, and transmitted over the communications channel.

At a receiver, the generic-spread-spectrum-processing means recovers the carrier signal, $\cos \omega_o t$, from the CDMA signal, $x_o$ (t), and the message-spread-spectrum-processing means despreads the CDMA signal, $x_o$ (t), as a modulated-data signal, $d_1$ (t). More particularly, referring to FIG. 2, the CDMA signal received from the communications channel 110, is divided by power splitter 115. The receiver-generic-chip-code generator 121 generates a replica of the generic-chip-code signal, $g_0$ (t). The generic mixer 123 uses the replica of the generic-chip-code signal for despreading the CDMA signal, $x_c$ (t), from the power splitter 115, as a recovered-carrier signal. The spread-spectrum channel, of the CDMA signal having the generic-chip-code signal, $g_0$ (t) $\cos \omega_o t$, generally does not include data so that despreading the CDMA signal produces the carrier signal, only. The generic-bandpass filter 125 filters the recovered-carrier signal at the carrier frequency, or equivalently, at an intermediate frequency. In comparison to the message-bandpass filter 126 which has a bandwidth sufficiently wide for filtering a modulated-data signal, the generic-bandpass filter 125 can have a very narrow bandwidth for filtering the recovered-carrier signal. The very narrow bandwidth of the generic-bandpass filter 125 assists in extracting the recovered-carrier signal from noise.

The acquisition and tracking circuit 131 acquires and tracks the recovered-carrier signal from an output of the generic-bandpass filter 125. The replica of the generic-chip-code signal from the receiver-generic-chip-code generator 121 is synchronized to the recovered-carrier signal via acquisition and tracking circuit 131.

The receiver-message-chip-code generator 122 generates a replica of the message-chip-code signal, $g_1$ (t). The replica of the message-chip-code signal, $g_1$ (t), is synchronized to the replica of the generic-chip-code signal, $g_0$ (t), from the receiver-generic-chip-code generator 121. Thus, the receiver-message-chip-code generator 122, via synchronization to the receiver-generic-chip-code generator 121, has the same synchronization as the transmitter-message-chip-code generator 102 via synchronization to the transmitter-generic-chip-code generator 101. Accordingly, the spread-spectrum communications channel having the generic-chip-code signal provides coherent spread-spectrum demodulation of the spread-spectrum channels with data.

The message mixer 124 uses the replica of the message-chip-code signal for despreading the CDMA signal from the power splitter 115, to generate a modulated-data signal, $d_1$ (t) $\cos \omega_o t$. The modulated-data signal effectively is the message data modulated by the carrier signal. The message-bandpass filter 126 filters the modulated-data signal at the carrier frequency, or equivalently at an intermediate frequency (IF). Down converters, which convert the modulated-data signal to an IF, optionally may be used without altering the cooperative functions or teachings of the present invention.

The detector 139 demodulates the modulated-data signal as a detected signal. The detected signal is filtered through lowpass filter 128, sampled by electronic switch 130 and outputted as received data, $d_1$ (t). The received data, without errors, are identical to the message data. The lowpass filter 128 and electronic switch 130 operate in an "integrate and dump" function, respectively, under the control of the bit synchronizer 129.

The bit synchronizer 129 controls the integrating and dumping of lowpass filter 128 and electronic switch 130. The bit synchronizer 129 preferably derives synchronization using the replica of the generic-chip-code signal from the receiver-generic-chip-code generator 121 as illustrated in FIG. 2. The bit synchronizer 129 also may derive synchronization from an output of the detector 139, as illustrated in FIG. 1.

In a preferred embodiment, the bit synchronizer 129 receive the replica of the generic-chip-code signal, $g_0$ (t), from the receiver-generic-chip-code generator 121. The replica of the generic-chip-code signal, by way of example, may include a chip codeword having 8250 chips. Assuming that there are eleven bits per chip codeword, then there are 750 chips per bit of data. Since the replica of the generic-chip-code signal provides information to the bit synchronizer 129 as to where the chip codeword begins, the bit synchronizer 129 thereby knows the timing of the corresponding bits for synchronization.

The present invention further may include transmitting as the CDMA signal, a plurality of spread-spectrum-processed signals for handling a plurality of message data. In this case the invention includes a plurality of message means and a plurality of spreading means. Referring to FIG. 3A, the plurality of message means may be embodied as a plurality of transmitter-message-chip-code generators and the plurality of spreading means may be embodied as a plurality of EXCLUSIVE-OR gates. The plurality of transmitter-message-chip-code generators generates a plurality of message-chip-code signals. In FIG. 3A, the plurality of transmitter-message-chip-code generators is shown as first transmitter-message-chip-code generator 102 generating first message-chip-code signal, $g_1$ (t), second transmitter-message-chip-code generator 172 generating second message-chip-code signal, $g_2$ (t), through $N^{th}$ transmitter-message-chip-code generator 182 generating $N^{th}$ message-chip-code signal, $g_N$ (t). The plurality of EXCLUSIVE-OR gates is shown as first EXCLUSIVE-OR gate 103, second EXCLUSIVE-OR gate 173, through $N^{th}$ EXCLUSIVE-OR gate 183. The plurality of EXCLUSIVE-OR gates generates a plurality of spread-spectrum-processed signals by modulo-2 adding the plurality of message data $d_1$ (t), $d_2$ (t), . . . , $d_N$ (t) with the plurality of message-chip-code signals $g_1$ (t), $g_2$ (t), . . . , $g_N$ (t), respectively. More particularly, the first message data, $d_1$ (t), are modulo-2 added with the first message-chip-code signal, $g_1$ (t), the second message data, $d_2$ (t), are modulo-2 added with the second message-chip-code signal, $g_2$ (t), through the $N^{th}$ message data, $d_N$ (t), which are modulo-2 added with the $N^{th}$ message-chip-code signal, $g_N$ (t).

The transmitter-generic-chip-code generator 101 is coupled to the plurality of transmitter-message-chip-code generators and the source for the plurality of message data, $d_1$ (t), $d_2$ (t), . . . $d_N$ (t). The generic-chip-code signal $g_0$ (t), in a preferred embodiment, provides synchronous timing for the plurality of message-chip-code signals $g_1$ (t), $g_2$ (t), . . . , $g_N$ (t), and the plurality of message data $d_1$ (t), $d_2$ (t), . . . , $d_N$ (t).

The combiner 105 combines the generic-chip-code signal and the plurality of spread-spectrum-processed signals, by linearly adding the generic-chip-code signal with the plurality of spread-spectrum-processed signals. The combined signal typically is a multilevel signal, which has the instantaneous voltage levels of the generic-chip-code signal and the plurality of spread-spectrum-processed signals.

The modulator 107, as part of the transmitter, modulates the combined generic-chip-code signal and the plurality of spread-spectrum-processed signals by a carrier signal, cos $\omega_o$ t, at a carrier frequency, $f_o$. The modulated generic-chip-code signal and the plurality of spread-spectrum processed signals are transmitted over the communications channel 110 as a CDMA signal, $x_c$ (t). The CDMA signal, $x_c$ (t) has the form:

$$x_c(t) = g_0(t) + \sum_1^N [g_i(t) + d_i(t)]\cos\omega_0 t$$

Thus, the CDMA signal includes the generic-chip-code signal and the plurality of spread-spectrum-processed signals as if they were each modulated separately, and synchronously, on separate carrier signals with the same carrier frequency, $f_o$, and transmitted over the communications channel.

Figure 3B:
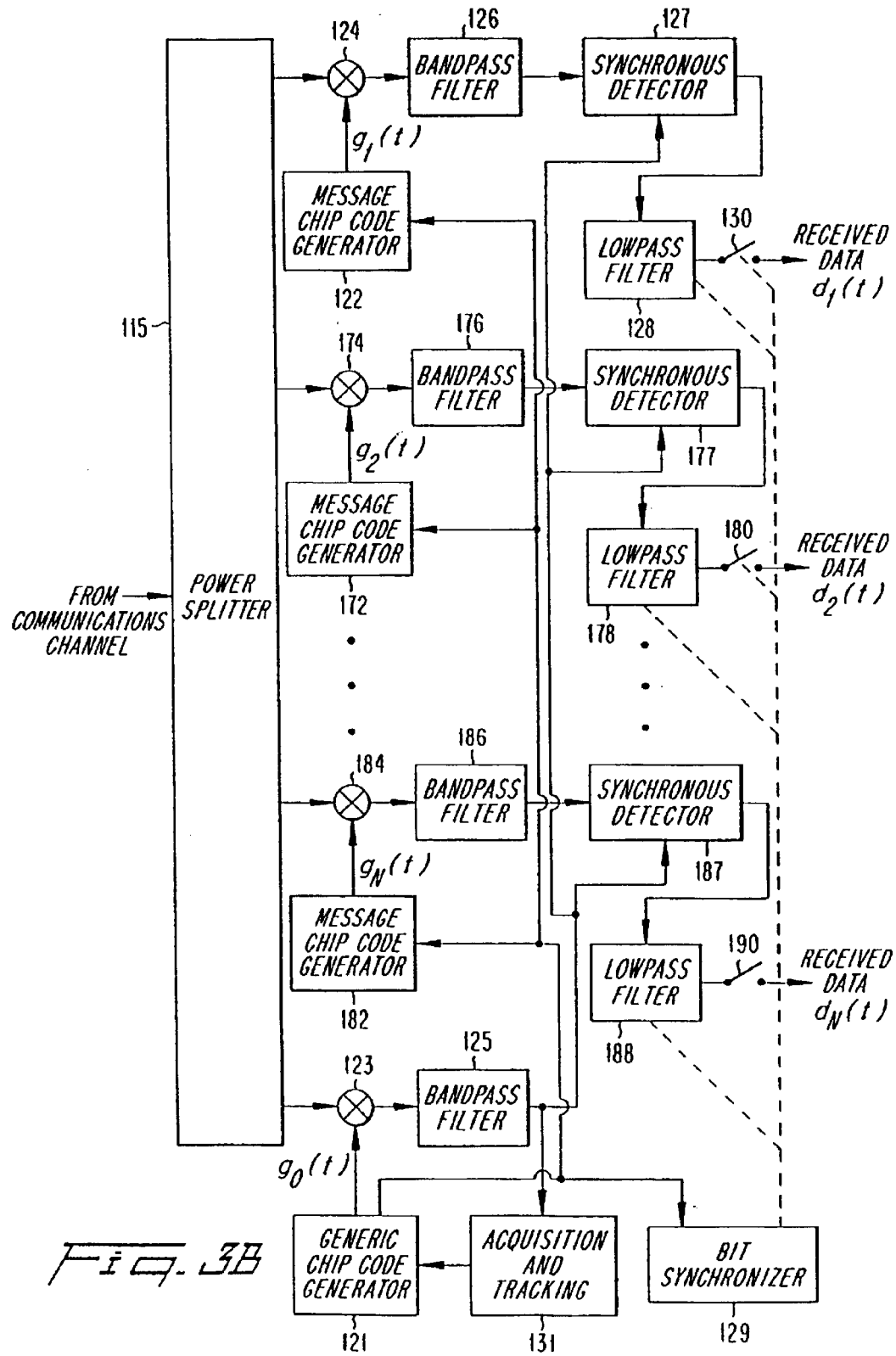
FIG. 3B shows a spread spectrum receiver using a synchronous detector for receiving a plurality of spread-spectrum processed signals.

The present invention includes receiving a CDMA signal which has a plurality of spread-spectrum-processed signals. The receiver further includes a plurality of message-spread-spectrum processing means, a plurality of detection means and a plurality of synchronous means. The plurality of message-spread-spectrum-processing means, as shown in FIG. 3B, may be embodied as a plurality of message-chip-code generators, a plurality of message mixers and a plurality of message-bandpass filters. A mixer is connected between a respective message-chip-code generator and message-bandpass filter. The plurality of message mixers is coupled to the power splitter 115. More particularly, the plurality of message-chip-code generators is shown embodied as first message-chip-code generator 122, second message-chip-code generator 172, through $N^{th}$ message-chip-code generator 182. The plurality of message mixers is shown as first message mixer 124, second message mixer 174 through $N^{th}$ message mixer 184. The plurality of message-bandpass filters is shown as first message-bandpass filter 126, second message-bandpass filter 176, through $N_{th}$ message-bandpass filter 186.

The plurality of detection means may be embodied as a plurality of synchronous detectors which is shown as first synchronous detector 127, second synchronous detector 177 through $N^{th}$ synchronous detector 187. Each of the plurality of synchronous detectors are coupled to one of the plurality message-bandpass filters.

The plurality of synchronous means may include a bit synchronizer 129, a plurality of lowpass filters and a plurality of electronic switches. The plurality of lowpass filters is shown as first lowpass filter 128, second lowpass filter 178, through $N^{th}$ lowpass filter 188. The plurality of electronic switches is shown as first electronic switch 130, second electronic switch 180 through $N^{th}$ electronic switch 190. Each of the plurality of synchronous detectors is coupled to an output of the generic-bandpass filter 125. The recovered-carrier signal from the generic-bandpass filter 125 serves as the reference signal for synchronously demodulating each of the plurality of message-data signals by the plurality of synchronous detectors, as a plurality of received data, $d_1(t), d_2(t), \ldots, d_N(t)$.

The detection means alternatively may be embodied as a plurality of nonsynchronous detectors, such as envelope detectors 139, 189, 199, as shown in FIG. 3C. Typically, the nonsynchronous detectors do not require the recovered-carrier signal.

The bit synchronizer 129 derives timing from the replica of the generic-chip-code signal, $g_0(t)$, and controls the timing of the integrating and dumping functions of the plurality lowpass filters and the plurality of electronic switches.

With the use of the invention as embodied in FIG. 3B, a generic-spread-spectrum channel, as part of the CDMA signal, provides the recovered-carrier signal, as discussed previously. The acquisition and tracking circuit 131 acquires and tracks the recovered-carrier signal from an output of the generic-bandpass filter 125. The replica of the generic-chip-code signal from the receiver-generic-chip-code generator 121 is synchronized to the recovered-carrier signal via acquisition and tracking circuit 131. The receiver-generic-chip-code generator 121 generates a replica of the generic-chip-code signal, $g_0(t)$, which provides timing to bit synchronizer 129 and to the plurality of receiver-message-chip-code generators 122, 172, 182.

The present invention also includes a method for synchronously demodulating a CDMA signal. Message data are input to the spreading means. Referring to FIG. 4, the method comprises the steps of generating 403 a generic-chip-code signal. The method further includes generating 405 message data synchronized to the generic-chip-code signal, and generating 407 a message-chip-code signal synchronized 408 to the generic-chip-code signal. Message data are processed, using a spread-spectrum modulator, with the message-chip-code signal to generate a spread-spectrum-processed signal. The generic-chip-code signal is combined 409 with the spread-spectrum-processed signal. The method transmits 411 the combined generic-chip-code signal and spread-spectrum-processed signal on a carrier signal over the communications channel as a CDMA signal, which the receiver receives 412 as a spread spectrum communications signal.

At a receiver, the method includes recovering 413 the carrier signal from the CDMA signal and despreading 415 the CDMA signal as a modulated-data signal. The recovered-carrier signal is used to synchronize the step of despreading the CDMA signal and to optionally synchronously demodulate 417 and output 419 the modulated-data signal as received data.

In use of system as set forth in FIG. 3A, the transmitter-generic-chip-code generator 101 generates the generic-chip-code signal, $g_0(t)$. Message data are spread-spectrum processed by the EXCLUSIVE-OR device 103 with message-chip-code signal, $g_1(t)$, from transmitter-message-chip-code generator 102. The combiner 105 combines the generic-chip-code signal with the spread-spectrum-processed signal. The combined signal may be, for example, a multilevel signal, which is generated by linearly adding the voltage levels of the generic-chip-code signal and the spread-spectrum-processed signal, or by adding the voltage levels of the generic-chip-code signal with a plurality of spread-spectrum-processed signals. The transmitter transmits on a carrier signal having a carrier frequency, $f_o$, the combined generic-chip-code signal and the plurality of spread-spectrum-processed signals. The CDMA signal is transmitted through the communications channel 110.

At the receiver, as shown in FIG. 3B, the generic-spread-spectrum-processing means, embodied as the receiver-generic-chip-code generator 121, the generic mixer 123 and the generic-bandpass filter 125, cooperatively operate to recover the carrier signal from the CDMA signal. The message-spread-spectrum-processing means, embodied as the receiver-message-chip-code generator 122, the message mixer 124 and the message-bandpass filter 126, cooperatively despread the CDMA signal as the modulated-data signal. The receiver-message-chip-code generator 122 preferably is synchronized to the replica of the generic-chip-code signal from the receiver-generic-chip-code generator 121. A plurality of receiver-message-chip-code generators may be employed, synchronized to the replica of the generic-chip-code signal. The synchronous means, embodied as the synchronous detector 127 synchronized to the recovered-carrier signal, demodulates the modulated-data signal as received data.

The received data are integrated and dumped by lowpass filter 128 and electronic switch 130, under control of the bit synchronizer 129. The bit synchronizer 129 preferably uses the replica of the generic-chip-code signal for synchronizing the integrate and dump functions.

Spread Spectrum Geolocation

A spread spectrum code division multiple access (CDMA) communications and geolocation system and method for use over a communications channel is provided comprising at least one base station and a plurality of remote units. The remote units may be mobile or in a fixed, stationary location. Message data are communicated between the base stations and the remote units. Message data include, but are not limited to, digitized voice, computer data, facsimile data, video data, etc. The base station communicates base-message data to the plurality of remote units. A remote unit communicates remote-message data to the base station. Base-message data are defined herein to be message data originating from a base station, and remote-message data are defined herein to be message data originating from a remote unit. The following discussion is of a preferred embodiment with the range between the base station and remote unit being determined at the base station. The roles of the base station and remote unit can be interchanged, as an equivalent to those skilled in the art, with the range being determined at the remote unit.

In the exemplary arrangement shown in FIG. 5, a base station includes base-spreading means, base-generic means, base-combiner means, base-transmitter means, and base antenna. The term "base" is used as a prefix to indicate an element is located at the base station, or that a signal originates from a base station.

The base-spreading means spread-spectrum processes the base-message data, $d_1(t)$. The base-spreading means is embodied as a base-spread-spectrum modulator. The base-spread-spectrum in modulator is shown as a message-chip-code generator 502 and an EXCLUSIVE-OR gate 503. The EXCLUSIVE-OR gate 503 is coupled to the message-chip-code generator 502. The message-chip-code generator 502 uses a chip codeword for generating a chip-code sequence for spread-spectrum processing base-message data, $d_1(t)$. The chip-code sequence from message-chip-code generator 502 is spread-spectrum processed by modulo addition by EXCLUSIVE-OR gate 503. Many equivalent circuits can be used for the base-spread-spectrum modulator, including but not limited to, product devices for multiplying the chip-code sequence by the base-message data, matched filters and surface acoustic wave devices which have an impulse response matched to the chip-code sequence, as is well known to those skilled in the art.

The base-generic means generates a base-generic-chip-code signal. The term "generic" is used as a prefix to indicate that the generic-chip-code signal is an unmodulated, or low data rate, direct-sequence spread-spectrum signal, which can serve as a pilot channel. The pilot channel allows a user to acquire timing, and provides a phase reference for coherent demodulation. The base-generic means is embodied as a base-generic-chip-code generator 501. The base-generic-chip-code generator 501 generates a base-generic-chip-code signal, using a chip codeword commonly shared with all remote units communicating with the base station. The message-chip-code generator 502 is coupled to the base-generic-chip-code generator 501, for deriving common timing. Alternatively, a common clock can be used for providing the timing signal to the message-chip-code generator 502 and the base-generic-chip-code generator 501.

The base-combiner means combines the base-generic-chip-code signal with the spread-spectrum-processed-base-message data, to generate a base-CDMA signal. The base-combiner means is embodied as a base combiner 505. The base combiner 505 is coupled to the base-generic-chip-code generator 501 and the EXCLUSIVE-OR gate 503. The base combiner 505 linearly adds the base-generic-chip-code signal with the spread-spectrum-processed-base-message data from EXCLUSIVE-OR gate 503. The resulting signal at the output of the base combiner 505 is a code division multiple access (CDMA) signal, denoted herein as the base-CDMA signal. Selected variations of nonlinear combining also may be used, so long as the resulting base-CDMA signal can have its channels detected at a spread-spectrum receiver.

The base-transmitter means transmits the base-CDMA signal from the base station to a remote unit. The base-transmitter means is embodied as a signal source 508 and product device 507. The product device 507 is coupled between the base combiner 505 and the signal source 508. The signal source 508 generates a first carrier signal at a first carrier frequency $f_1$. The base-CDMA signal, from the output of the base combiner 505, is multiplied by the first carrier signal by product device 507. Other transmitting devices are well known in the art for putting a desired signal at a selected carrier frequency.

The base antenna 509 is coupled through an isolator 513 to the base-transmitter means. The base antenna 509 radiates the base-CDMA signal at the first carrier frequency.

As illustratively shown in FIG. 6, a remote unit includes a remote antenna 511, remote-detection means, remote-spreading means, remote-combiner means, and remote-transmitter means. Each remote unit also may include remote-generic means. The term "remote" is used as a prefix to indicate an element is located at a remote unit, or that a signal originates from the remote unit. The remote antenna 511 receives the base-CDMA signal, radiated from the base station.

The remote-detection means is coupled to the remote antenna 511. The remote-detection means detects the base-generic-chip-code signal embedded in the base-CDMA signal. Using the detected-base-generic-chip-code signal, the remote-detection means recovers the base-message data communicated from the base station. A remote unit can retransmit the detected-base-generic-chip-code signal, or optionally, can have remote-generic means generate a different remote-generic-chip-code signal.

In FIG. 6, the remote-detection means is embodied as a product device 536, bandpass filter 537, acquisition and tracking circuit 538, generic-chip-code generator 539, message-chip-code generator 541, product device 542, bandpass filter 543, data detector 544, lowpass filter 545, and bit synchronizer 540. As is well known in the art, other devices and circuits can be used for the same function, including but not limited to, matched filters, surface acoustic wave devices, etc. This circuit acquires and tracks the base-generic-chip-code signal embedded in the base-CDMA signal. The base-CDMA signal is received at remote antenna 511, and passes through isolator 534 and power splitter 535. The base-generic-chip-code signal is detected using product device 536, bandpass filter 537, acquisition and tracking circuit 538 and generic-chip-code generator 539. The function of this circuit is as described in the previous section. The detected-base-generic-chip-code signal is used to recover the base-messages data embedded in the base-CDMA signal, using message-chip-code generator 541, product device 542, bandpass filter 543, data detector 544, lowpass filter 545, and bit synchronizer 540. The data detector 544 may operate coherently or noncoherently. The detected base-message data is outputted as detected data, $d_{R1}(t)$.

If the base-generic-chip-code signal is to be combined as part of the remote-CDMA signal, then generic-chip-code generator 546 is not required, since the base-generic-chip-code signal is available at the output of the generic-chip-code generator 539. If a remote-generic-chip-code signal, which is different from the base-generic-chip-code signal, is to be used, then the generic-chip-code generator 546 can be used for generating the remote-generic-chip-code signal. In the latter case, the remote-generic-chip-code signal is clocked or synchronized with the detected base-generic-chip-code signal. For purposes of discussion, the remote-generic-chip-code signal is considered to be sent from the remote unit to the base station, with the understanding that the remote-generic-chip-code signal can be identical to, or one and the same as, the detected base-generic-chip-code signal.

The remote-spreading means spread-spectrum processes remote-message data. The remote-spreading means is embodied as a remote-spread-spectrum modulator. The remote-spread-spectrum modulator is shown as a message-chip-code generator 548 and an EXCLUSIVE-OR gate 547. The EXCLUSIVE-OR gate 547 is coupled to the message-chip-code generator 548. The message-chip-code generator 548 uses a chip codeword for generating a chip-code sequence for spread-spectrum processing remote-message data, $d_2(t)$. The chip-code sequence from message-chip-code generator 548 is spread-spectrum processed by modulo addition by EXCLUSIVE-OR gate 547. Many equivalent circuits can be used for the remote-spreading means, including but not limited to, product devices for multiplying the chip-code sequence by the base-message data, matched filters and surface acoustic wave devices, as is well known to those skilled in the art.

The remote-generic-chip-code signal and the spread-spectrum-processed-remote-message data are combined by the remote-combiner means, as a remote-CDMA signal. The remote-combiner means is embodied as a remote-combiner 549. The remote combiner 549 is coupled to the EXCLUSIVE-OR gate 547, and the remote-generic-chip-code generator 546, or alternatively to the generic-chip-code generator 539. The remote combiner 549 linearly adds the remote-generic-chip-code signal with the spread-spectrum-processed-remote-message data from EXCLUSIVE-OR gate 547. The resulting signal at the output of the remote combiner 549 is a code division multiple access (CDMA) signal, denoted herein as the remote-CDMA signal. Selected variations of nonlinear combining also may be used, so long as the resulting remote-CDMA signal can have its channels detected at a spread-spectrum receiver.

The remote unit also includes the remote-transmitter means for transmitting the remote-CDMA signal from the remote unit to the base station. The remote-transmitter means is embodied as a signal source 551 and product device 550. The product device 550 is coupled between the remote combiner 549 and the signal source 551. The signal source 551 generates a carrier signal at a second carrier frequency $f_2$. The remote-CDMA signal, from the output of the remote combiner 549, is multiplied by the second carrier signal by product device 550. Other transmitting devices are well known in the art for putting a desired signal at a selected carrier frequency. The second carrier frequency may be the same as, or different from, the first carrier frequency.

The remote antenna 511 is coupled through an isolator 534 to the remote-transmitter means. The remote antenna 511 radiates the remote-CDMA signal at the second carrier frequency.

Each of the base stations further includes base-detection means and range means. The base-detection means is coupled to the base antenna 509 through isolator 513 and power splitter 515. The base detection means detects the remote-generic-chip-code signal embedded in the remote-CDMA signal. The base-detection means, as illustrated in FIG. 5, may be embodied as a base detector which may includes a product device 523, bandpass filter 525, acquisition and tracking circuit 531, generic-chip-code generator 521, message-chip-code generator 522, product device 524, bandpass filter 526, data detector 527, lowpass filter 528, and bit synchronizer 529. As is well known in the art, the base detection means may be embodied with other devices and circuits which perform the same function, including but not limited to, matched filters, surface acoustic wave devices, etc. This circuit acquires and tracks the remote-generic-chip-code signal embedded in the remote-CDMA signal. The remote-CDMA signal is received at base antenna 509, and passes through isolator 513 and power splitter 515. The remote-generic-chip-code signal is detected using product device 523, bandpass filter 525, acquisition and tracking circuit 531 and generic-chip-code generator 521. The function of this circuit is as previously described. The detected-remote-generic-chip-code signal is used to recover the remote-message data embedded in the remote-CDMA signal, using message-chip-code generator 522, product device 524, bandpass filter 526, data detector 527, lowpass filter 528, and bit synchronizer 529. The data detector 527 may operate coherently or noncoherently. The detected remote-message data is outputted as detected data, $d_{R2}(t)$. Thus, the base detector recovers, using the detected-remote-generic-chip-code signal, the remote message data communicated from the remote unit.

Using the detected-remote-generic-chip-code signal and the base-generic-chip-code signal, the range means determines a range delay between the remote unit and the base station. The range means is embodied as a range delay device 530, which can compare the timing between the base-generic-chip-code signal from the generic-chip-code generator 501, with the detected remote-generic-chip-code signal from the generic-chip-code generator 521.

The present invention may include further the steps of spread-spectrum processing the base-message data; generating a base-generic-chip-code signal; combining the base-generic-chip-code signal with the spread-spectrum-processed-base-message data, thereby generating a base-CDMA signal; transmitting the base-CDMA signal from the base station to the remote unit; detecting the base-generic-chip-code signal embedded in the base-CDMA signal; recovering, using the detected-base-generic-chip-code signal, the base-message data; spread-spectrum processing remote-message data; generating, using the detected-generic-chip-code signal and the spread-spectrum-processed-remote data, a remote-CDMA signal; transmitting the remote-CDMA signal from the remote unit to the base station; detecting the remote-generic-chip-code signal embedded in the remote-CDMA signal; recovering, using the detected-remote-generic-chip-code signal, the remote-message data; and determining, using the detected-remote-generic-chip-code signal and the base-generic-chip-code signal, a range delay between the remote unit and the base station.

In use, the base station spread-spectrum processes the base-message data with a message-chip-code signal, and combines the spread-spectrum-processed-base-message data with a base-generic-chip-code signal. The combined signal is a base-CDMA signal which is transmitted over a communications channel to at least one remote unit.

The remote unit receives the base-CDMA signal, detects the base-generic-chip-code signal embedded in the base-CDMA signal, and uses the detected-base-generic-chip-code signal to recover the base-message data embedded in the base-CDMA signal.

The detected base-generic-chip-code signal is relayed as a remote-generic-chip-code signal, or is used to set the timing for a different remote-generic-chip-code signal, which is sent from the remote unit to the base station. The remote unit spread-spectrum processes the remote-message data with a remote-chip-code signal, and combines the spread-spectrum-processed-remote-message data with the remote-generic-chip-code signal as a remote-CDMA signal. The remote-CDMA signal is sent over the communications channel to the base station.

At the base station, the remote-generic-chip-code signal is detected from the remote-CDMA signal, and the detected remote-generic-chip-code signal is used to detect the remote-message data embedded in the remote-CDMA signal. Additionally, the detected remote-generic-chip-code signal is compared with the base-generic-chip-code signal in a range-delay circuit, to determine the range of the remote unit from the base station. Effectively, the range between the remote unit and the base station is a function of the timing between sending a sequence of the chip codeword which generated the base-generic-chip-code signal, and receiving the sequence generated by the chip codeword which generated the remote-generic-chip-code signal.

The concept of using a radio frequency (RF) signal to determine range is well known in the art. The RF signal is subject to a fixed rate of propagation, $3 \times 10^8$ meters/sec. The RF signal leaves a transmitter some time before it reaches a receiver. A particular sequence of the base-generic-chip-code signal and remote-generic-chip-code signal are used as a mark in time. The difference in time of the sequence of the base-generic-chip-code signal as seen at the receiver of the remote unit, from that present at the transmitter of the base station, is related directly to distance between the base station and remote unit. Similarly, the difference in time of the sequence of the remote-generic-chip-code signal as seen at the receiver of the base station from that present at the transmitter of the remote unit, is related directly to distance between the remote unit and base station.

The use of the base-generic-chip-code signal and the remote-generic-chip-code signal is a common type of echo range measurement method that is used in radar systems. Many radar systems simply employ a pulse of RF energy and then wait for a return of a portion of the energy due to the pulse being reflected from objects. The radar marks time from the instant of pulse transmission until its return. The time required for the pulse to return is a function of the two-way range to the object. The range is easily determined from the signal propagation speed.

The spread-spectrum signals of the present invention are subject to the same distance/time relationship. The spread-spectrum signal of the present invention has an advantage in that its phase is easily resolvable. The basic resolution of a sequence of a base-chip-code signal or a remote-chip-code signal is one code chip. Thus, the higher the chip rate, the better the measurement capability. Thus, at a chip rate of 10 Mchips/sec, a basic range resolution is $10^{-7}$ seconds, or 30 meters.

Additional delays may be encountered in the circuitry of the remote unit. These delays can be compensated at the base station, when determining the distance between the base station and the remote unit.

It will be apparent to those skilled in the art that various modifications can be made to the synchronous spread-spectrum communications system and method of the instant invention without departing from the scope or spirit of the invention, and it is intended that the present invention cover modifications and variations of the synchronous spread-spectrum communications system and method provided they come in the scope of the appended claims and their equivalents.

What is claimed is:

1. A spread spectrum base station comprising:
   means for receiving a combined spread spectrum signal, the spread spectrum signal including a reference signal and a plurality of message signals, the message signals having message data;
   means, including a plurality of detector means and synchronization means, for detecting the reference signal within the received combined spread spectrum signal;
   means for generating a base reference signal at the base station;
   means to synchronize the base reference signal with the detected reference signal; and
   means for recovering the message data of at least one of the message signals using information from the detected reference signal, said means demodulating each of a plurality of message data signals.

2. The base station of claim 1 further comprising:
   means for recovering a carrier signal from the spread spectrum signal using the reference signal; and
   wherein the message data recovering means uses the recovered carrier signal to recover the message data.

3. The base station of claim 1 wherein the spread spectrum signal is in a code division multiple access format.

4. The base station of claim 1, wherein:
   the means for generating a base reference signal at the base station relays the reference signal, the base reference signal transmitted from the base station;
   the base station spread-spectrum processes the base message data with the base reference signal, and combines the spread-spectrum-processed base message data with the base-reference signal as a base-CDMA signal; and
   the base station transmits the base-CDMA signal over a communications channel to a remote station.

5. The base station of claim 1, wherein:
   the means for generating a base reference signal at the base station uses the reference signal to set the timing for a different base reference signal, the base reference signal transmitted from the base station;
   the base station spread-spectrum processes the base message data with the base reference signal, and combines the spread-spectrum-processed base message data with the base-reference signal as a base-CDMA signal; and
   the base station transmits the base-CDMA signal over a communications channel to a remote station.

6. A spread spectrum base station comprising:
   means for receiving a combined spread spectrum signal, the spread spectrum signal including a reference signal and a message signal, the message signal having message data;
   means, including a plurality of detector means and synchronization means, for recovering a carrier signal of the combined spread spectrum signal using information from the detected reference signal;
   means for generating a base reference signal at the base station;
   means to synchronize the base reference signal with the detected reference signal; and
   means for recovering the message data using the recovered carrier signal.

7. The base station of claim 6 wherein the spread spectrum signal is in a code division multiple access format.

8. The base station of claim 6, wherein:
   the means for generating a base reference signal at the base station relays the reference signal, the base reference signal transmitted from the base station;
   the base station spread-spectrum processes the base message data with the base reference signal, and combines the spread-spectrum-processed base message data with the base-reference signal as a base-CDMA signal; and
   the base station transmits the base-CDMA signal over a communications channel to a remote station.

9. The base station of claim 6, wherein:
   the means for generating a base reference signal at the base station uses the reference signal to set the timing for a different base reference signal, the base reference signal transmitted from the base station;
   the base station spread-spectrum processes the base message data with the base reference signal, and combines the spread-spectrum-processed base message data with the base-reference signal as a base-CDMA signal; and
   the base station transmits the base-CDMA signal over a communications channel to a remote station.

10. A spread spectrum base station comprising:
    means for detecting a remote-generic-chip-code signal;
    means for producing a message signal having message data;
    means for producing a base-chip-code signal, the base-chip-code signal for use in recovering the message data from a combined spread spectrum signal;
    means to produce a base message signal having base message data;
    means for combining the base-chip-code signal and the base message signal as a combined signal; and
    means for transmitting the combined signal as the combined spread spectrum signal.

11. The base station of claim 10, wherein:
    the means for generating a base-chip-code signal at the base station relays the detected chip-code signal, the base-chip-code signal transmitted from the base station;
    the base station spread-spectrum processes the base message data with the base-chip-code signal, and combines the spread-spectrum-processed base message data with the base-chip-code signal as a base-CDMA signal; and the base station transmits the base-CDMA signal over a communications channel to a remote station.

12. The base station of claim 10, wherein:

the means for generating a base-chip-code signal at the base station uses the detected chip-code signal to set the timing for a different base-chip-code signal, the base-chip-code signal transmitted from the base station;

the base station spread-spectrum processes the base message data with the base-chip-code signal, and combines the spread-spectrum-processed base message data with the base-chip-code signal as a base-CDMA signal; and the base station transmits the base-CDMA signal over a communications channel to a remote station.

13. A spread spectrum base station comprising:

means for detecting a remote-generic-clip-code signal;

means for producing a plurality of message signals, each message signal having message data;

means for producing a base-chip-code signal, the base-chip-code signal for use in recovering the message data from a combined spread spectrum signal;

means to produce a transmitted message signal having base message data;

means for combining the base-chip-code signal and the base message signal as a combined signal; and means for transmitting the combined signal as the combined spread spectrum signal.

14. The base station of claim 13, wherein:

the means for generating a base reference signal at the base station relays the reference signal, the base reference signal transmitted from the base station;

the base station spread-spectrum processes the base message data with the base reference signal, and combines the spread-spectrum-processed base message data with the base-reference signal as a base-CDMA signal; and the base station transmits the base-CDMA signal over a communications channel to a remote station.

15. The base station of claim 13, wherein:

the means for generating a base reference signal at the base station uses the reference signal to set the timing for a different base reference signal, the base reference signal transmitted from the base station;

the base station spread-spectrum processes the base message data with the base reference signal, and combines the spread-spectrum-processed base message data with the base-reference signal as a base-CDMA signal; and the base station transmits the base-CDMA signal over a communications channel to a remote station.

* * * * *

UNITED STATES PATENT AND TRADEMARK OFFICE
CERTIFICATE OF CORRECTION

PATENT NO. : 6,925,071 B2
APPLICATION NO. : 10/072083
DATED : August 2, 2005
INVENTOR(S) : Donald L. Schilling It is certified that error appears in the above-identified patent and that said Letters Patent is hereby corrected as shown below:

ON THE TITLE PAGE

At Item (56), U.S. PATENT DOCUMENTS, page 2, left column, at entry "4,837,802 A 6/1989", delete "Hiashiyama et al." and insert --Higashiyama et al.--.

At Item (56), U.S. PATENT DOCUMENTS, page 2, right column, at entry "5,303,286 A 4/1994", delete "Weideman" and insert therefor --Wiedeman--.

At Item (56), OTHER PUBLICATIONS, page 3, right column, line 23, before the words "Multiple-Access", delete "Spead-Spectrum" and insert therefor --Spread-Spectrum--.

IN THE SPECIFICATION

At column 2, line 14, after the word "signal", delete "is" and insert therefor --are--.

At column 3, line 50, before the word "message", delete "desires" and insert therefor --desired--.

At column 5, line 10, after the word "device", delete "103 and the" and insert therefor --103. The transmitter- --.

At column 6, line 18, after the word "signal", delete "$x_o(t)$" and insert therefor--$x_c(t)$--.

At column 7, line 20, delete "FIG. 1" and insert there fore --FIG. 2--.

At column 7, line 22, before the words "the replica", delete "receive" and insert therefor --receives--.

At column 10, line 53, before the word "modulator", delete "in".

At column 13, line 25, before the words "a product", delete "includes" and insert therefor --include--.

UNITED STATES PATENT AND TRADEMARK OFFICE
CERTIFICATE OF CORRECTION

PATENT NO. : 6,925,071 B2
APPLICATION NO. : 10/072083
DATED : August 2, 2005
INVENTOR(S) : Donald L. Schilling It is certified that error appears in the above-identified patent and that said Letters Patent is hereby corrected as shown below:

At column 15, line 25, after the word "come", delete "in" and insert therefor --within--.

Signed and Sealed this

Twenty-sixth Day of December, 2006

JON W. DUDAS
*Director of the United States Patent and Trademark Office*